United States Patent
Pahl

(10) Patent No.: US 7,590,931 B2
(45) Date of Patent: Sep. 15, 2009

(54) METHOD AND APPARATUS FOR FORM POOLING

(75) Inventor: Shannon Pahl, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 309 days.

(21) Appl. No.: 11/038,999

(22) Filed: Jan. 20, 2005

(65) Prior Publication Data

US 2006/0161510 A1 Jul. 20, 2006

(51) Int. Cl.
*G06F 17/00* (2006.01)

(52) U.S. Cl. .................. 715/221; 715/222; 707/100; 707/104.1

(58) Field of Classification Search .......... 715/500, 715/505, 507, 511, 221–226; 707/1, 100, 707/200, 202, 204, 104.1; 717/100; 709/223, 709/226

See application file for complete search history.

(56) References Cited

U.S. PATENT DOCUMENTS

| | | | | |
|---|---|---|---|---|
| 5,664,217 | A * | 9/1997 | Cunningham et al. | 710/1 |
| 5,966,716 | A * | 10/1999 | Comer et al. | 707/203 |
| 6,088,700 | A * | 7/2000 | Larsen et al. | 707/10 |
| 6,275,916 | B1 * | 8/2001 | Weldon et al. | 711/170 |
| 6,327,598 | B1 * | 12/2001 | Kelley et al. | 715/513 |
| 6,377,957 | B1 * | 4/2002 | Jeyaraman | 707/200 |
| 6,725,241 | B1 * | 4/2004 | Rodriguez et al. | 707/203 |
| 6,748,425 | B1 * | 6/2004 | Duffy et al. | 709/217 |
| 6,950,822 | B1 * | 9/2005 | Idicula et al. | 707/10 |
| 7,398,313 | B1 * | 7/2008 | Inagaki et al. | 709/226 |
| 2002/0023108 | A1 * | 2/2002 | Daswani et al. | 707/507 |
| 2005/0066287 | A1 * | 3/2005 | Tattrie et al. | 715/769 |

OTHER PUBLICATIONS

Harold Davis, "Opening form instances in C#", Aug. 27, 2002, pp. 1-6, http://articles.techrepublic.com.com/5100-22-1050650.html.*
Harold Davis, "Manipulate instances of Windows forms in C#", Aug. 20, 2002, pp. 1-5, http://articles.techrepublic.com.com/5100-22-1053742.html?tag=rbxccnbtr1.*
Jamsa Klander et al., "C/C++ Programmer's Bible," paragraph 905 (Jamsa Press 1998), listed as Appendix A.
Ira Pohl, "Object- Oriented Programming Using C++," pp. 8-9 (2d ed., Addison-Wesley 1997), listed as Appendix B.
Ivor Horton, "Beginning C++," pp. 452-522 (Wrox Press 1998), listed as Appendix C.

* cited by examiner

*Primary Examiner*—Adam L Basehoar
(74) *Attorney, Agent, or Firm*—Marshall, Gerstein & Borun LLP

(57) ABSTRACT

A form pooling system allows efficient management of various forms used by a computer application. The form pooling system provides a close form module and an open form module to manage closing and opening various forms related to the application. The form pooling system significantly reduces form load time for complex forms by not having to re-create a form each time a client requests a form. The form pool may contain various types of previously used modeless forms and manages an upper limit of the number of forms that may be pooled to limit memory overhead. A form used in the form pooling system may be designed in a manner such that the form performs an unbinding operation when it is placed in a form pool and it performs a rebinding operation every time that form is retrieved from the form pool.

5 Claims, 5 Drawing Sheets

METHOD AND APPARATUS FOR FORM POOLING

TECHNICAL FIELD

This patent relates generally to computer software and more particularly to an application software using a plurality of forms.

BACKGROUND

Computers and computer software make a very important part of modern life and business. Specifically, for any business organization to stay competitive, it is imperative that it uses various computer based software to manage data, customers, employees, etc. Businesses use a number of different software for virtually every function of their daily operations, including payroll; customer relation management, accounting, inventory management, etc. Each of these various software generally use one or more underlying database to store data and a number of graphical user interface (GUI) based forms to interact with the computer user. Depending on the business model, there may also be one or more intermediate layers operating between such database and the forms presented to the end user.

For example, an accounting software may use a form to present data related to a transaction to a user. Alternatively a form may also be used to allow a user to input data that will be processed by that accounting software and/or stored in the underlying database. For example, a purchase form may be presented to a user of the accounting system to allow the user to input information regarding purchase of an item. Such a purchase form may have various fields, including the general ledger account number, the vendor information, inventory account if the purchased item is an inventory item, an expense account if the purchase item is an expense item, method of payment, payment account, etc. Each of the various fields that are displayed with the form may be attached to related tables in the database. The form may also be attached to one or more objects representing these fields.

Moreover, one or more of these fields, as well as the purchase form itself may have various controls attached to the them. An example of a control attached to a purchase form may be the sales tax rate to be applied to the purchased item based on applicable sales tax jurisdiction, or an authorization control that applies an authorization rule based on the monetary amount of the purchase, etc.

Based on the data and the controls attached to a form, every time a form in invoked by a user, it may take considerable amount of time to open a form. This problem may be even more acute in modeless operation of a software where a number of forms may be open simultaneously and data and controls from one or more of these simultaneously open forms may de related to data and controls from other one or more of these open forms. For example, an accounting software may allow a user to open a purchase form, an inventory report form and an income statement form simultaneously, wherein the changes made via the purchase form may affect the data related to the inventory report form as well as the income statement form. Such complex forms may increase the load time and therefore slow down the use of this forms, thus resulting in slower applications and inferior user experience. Thus, there is a need for providing a form management system that allows opening and displaying forms in a more efficient manner.

SUMMARY

A form pooling system allows efficient management of various forms used by a computer application. The form pooling system provides a close form module and an open form module to manage closing and opening various forms related to the application. The form pooling system significantly reduces form load time for complex forms by not having to re-create a form each time a client requests a form. The form pool may contain various types of previously used modeless forms and manages an upper limit of the number of forms that may be pooled to limit memory overhead. A form used in the form pooling system may be designed in a manner such that the form performs an unbinding operation when it is placed, in a form pool and it performs a rebinding operation every time that form is retrieved from the form pool.

BRIEF DESCRIPTION OF DRAWINGS

The present patent is illustrated by way of examples and not limitations in the accompanying figures, in which like references indicate similar elements, and in which.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Network

Figure 1:
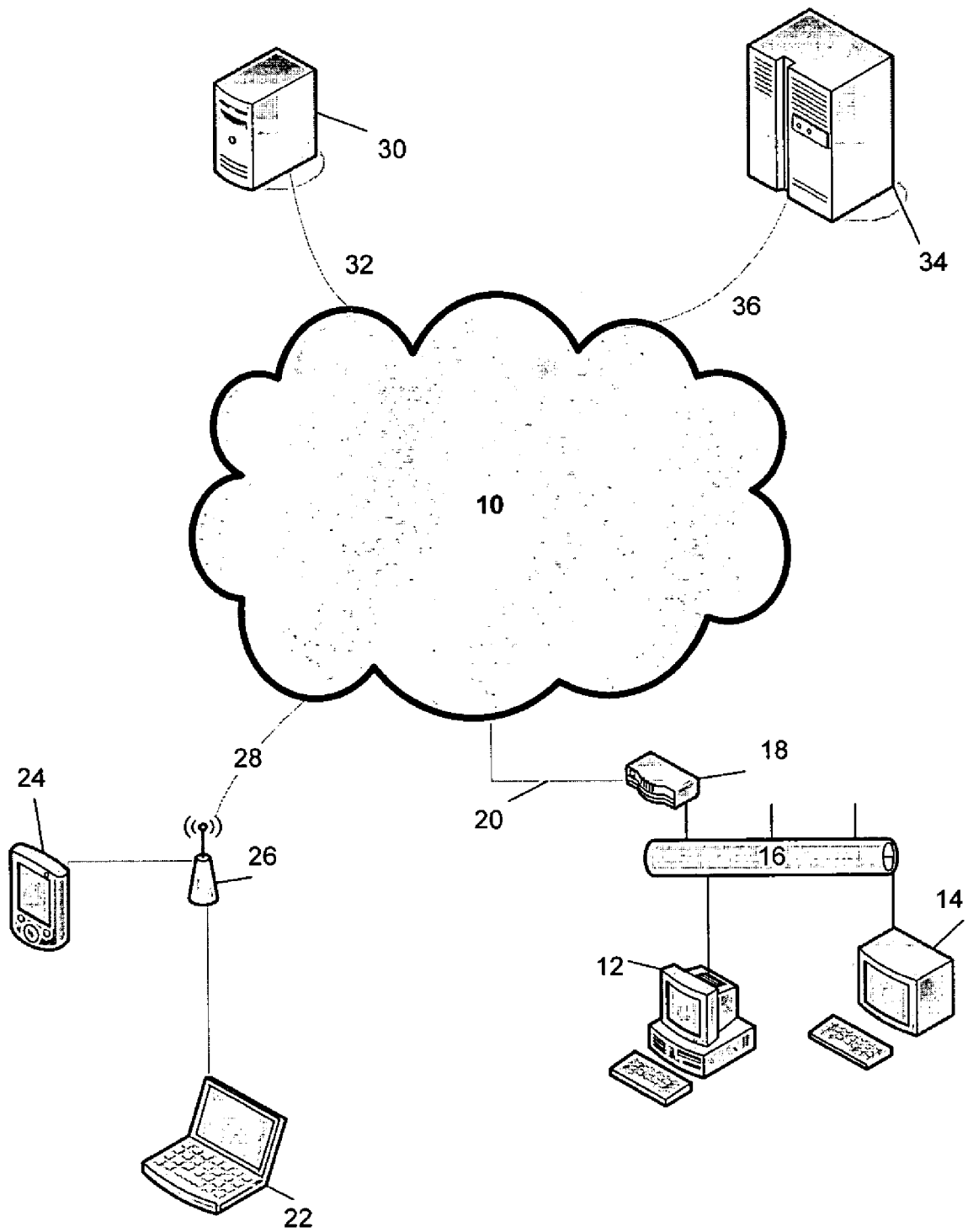
FIG. 1 is a block diagram of a network interconnecting a plurality of computing resources.

FIG. 1 illustrates a network 10 that may be used to implement an XML versioning system described herein. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet 16 and a router 18, and a landline 20. On the other hand, the network 10 may wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36. As it will be described below in further detail, one or more components of the dynamic software provisioning system may be stored and operated on any of the various devices connected to the network 10.

Computer

Figure 2:
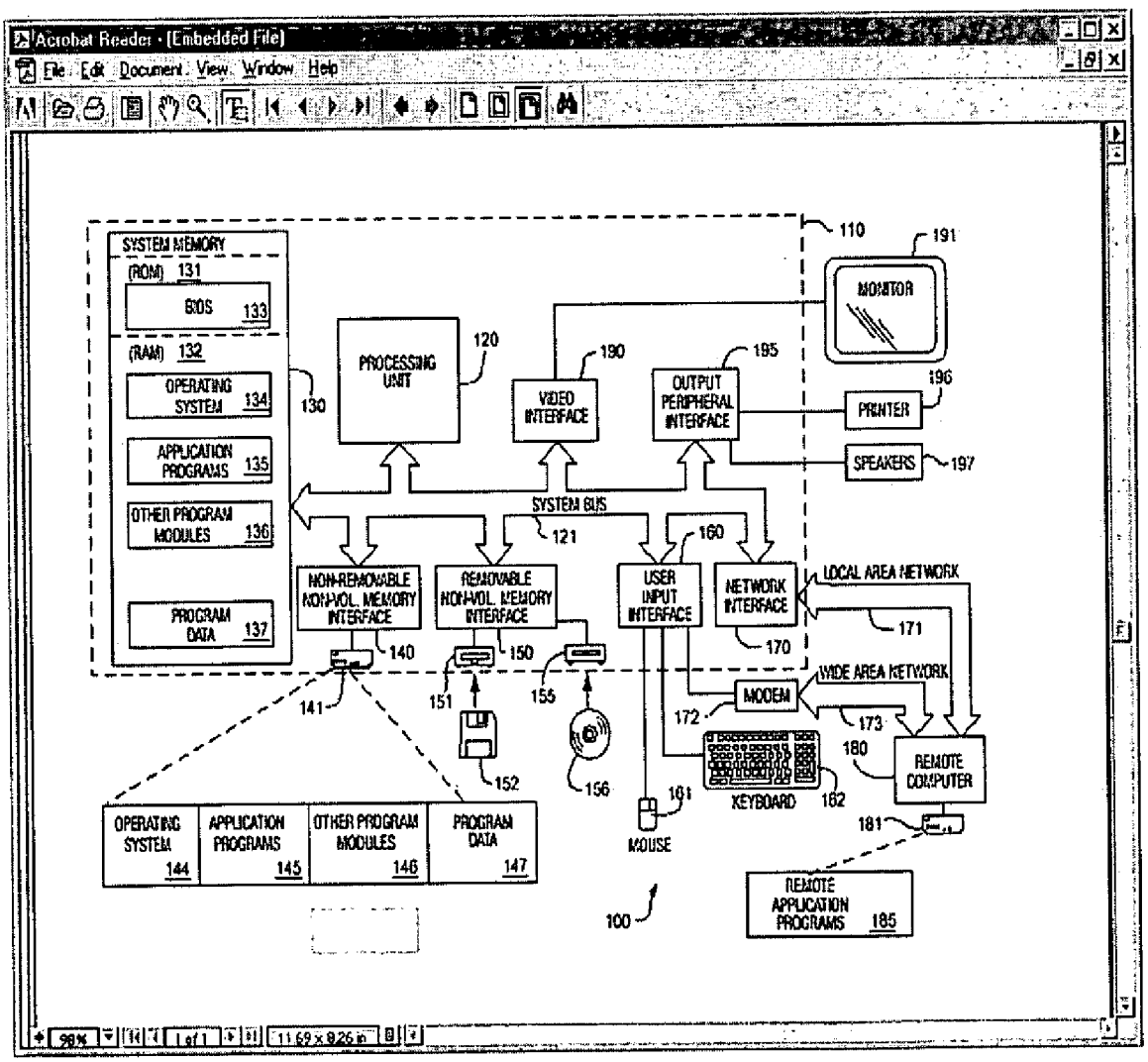
FIG. 2 is a block diagram of a computer that may be connected to the network of FIG. 1.

FIG. 2 illustrates a computing device in the form of a computer 110 that may be connected to the network 10 and used to implement one or more components of the dynamic software provisioning system. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 10 In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Form Pooling System

Figure 3:
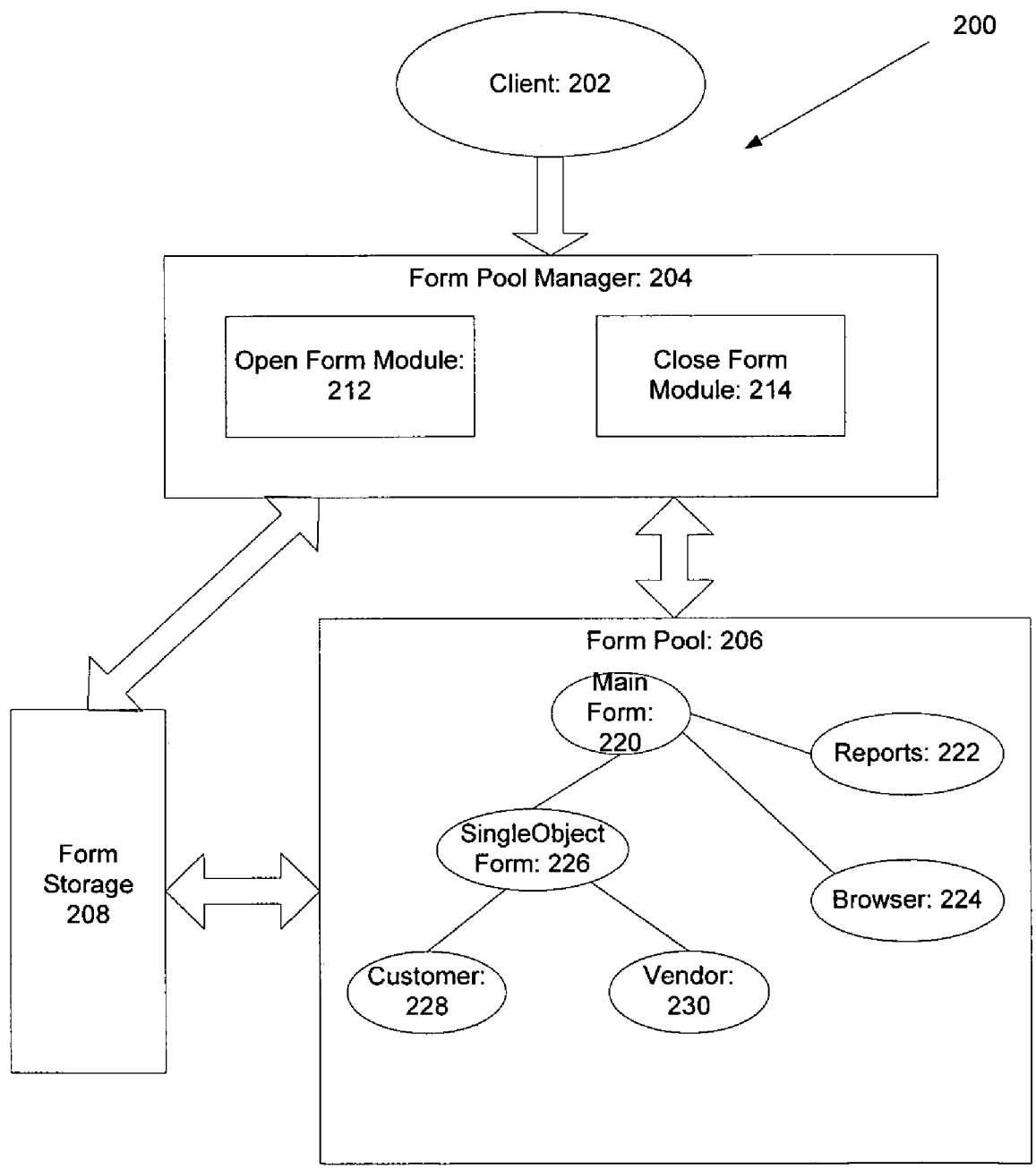
FIG. 3 illustrates a block diagram of a form pooling system.

FIG. 3 illustrates a block diagram of a form pooling system 200 that allows a client 202 to interact with a plurality of forms. The client 202 may be user of an application using one of the plurality of forms or it may be an application that may be calling the one of the plurality of forms. The form pooling system 200 includes a form pool manager 204, a form pool 206 and a form storage 208. Each of the various components of the form pooling system 200 may be stored in one of the one of the various computer storage media of the computer 110 or on any of the various devices on the network 10.

The form pool manager 204 may interact with the client 202 to receive various requests for one or more of the plurality of forms, where such forms may be stored in the form pool 206 or in the form storage 208. The form pool manager 204 may include an open form module 212 and a close form module 214. The open form module 212 and the close form module 214 may be implemented as software, as hardware, as firmware or as a combination of any of these.

The open form module 212 may receive a request from the client 202 for a form and may interact with form pool 206 and the form storage 208 to determine the status of the requested form and to open the requested form depending on the status of the requested form. The functioning of an exemplary implementation of the open form module 212 is described in further detail by a program as disclosed in FIG. 4.

The close form module 214 may receive a request from the client 202 to close a form that may be currently used by the client. In response to the request from the client 202, the close form module may close the form and store it in the form storage module 208. Alternatively, the close form module 214 may determine that the a currently used form needs to be kept open, in which case it may store that particular form in the form pool 206. The functioning of an exemplary implementation of the close form module 214 is described in further detail by a program as disclosed in FIG. 5.

The form pool 206 may be implemented in a memory module of the computer 110, preferably in a memory module that is easily accessible. For example, the form pool 206 may be implemented in the random access memory 132 of the computer so that any of the various forms in the form pool are accessible to the form pool manager 204 and to the client 202 at a very high speed. In an implementation of the form pool 206, the form pool 206 may be implemented as cache in the random access memory 132.

The form pool 206 may include various forms used by one or more clients interacting with the form pool manager 204. For example, if the form pool manager 204 is currently interacting with only one client 202, the form pool 206 may include various forms used by that particular client 202 only. However, in an alternate implementation, the form pool manager 204 may be interacting with a plurality of clients or client applications, in which case the form pool 206 may include forms related to one or more of such plurality of clients. For the purpose of clarity, the form pool 206 is shown to store forms related to only one of the client applications.

The form pool 206 is disclosed to include a main form 200 and various forms deriving from the main form, such as a reports form 222, a browser form 224, a single object form 226, etc., wherein the single object form 226 may have a customer form 228 and a vendor form 230 deriving from it. Each of the various forms 220-230 may be implemented in form of objects such that each of these forms includes various data structure, processes, controls, etc., related to these forms. The forms 220-230 may be related to an accounting application, a customer relation management application, etc.

Figure 4:
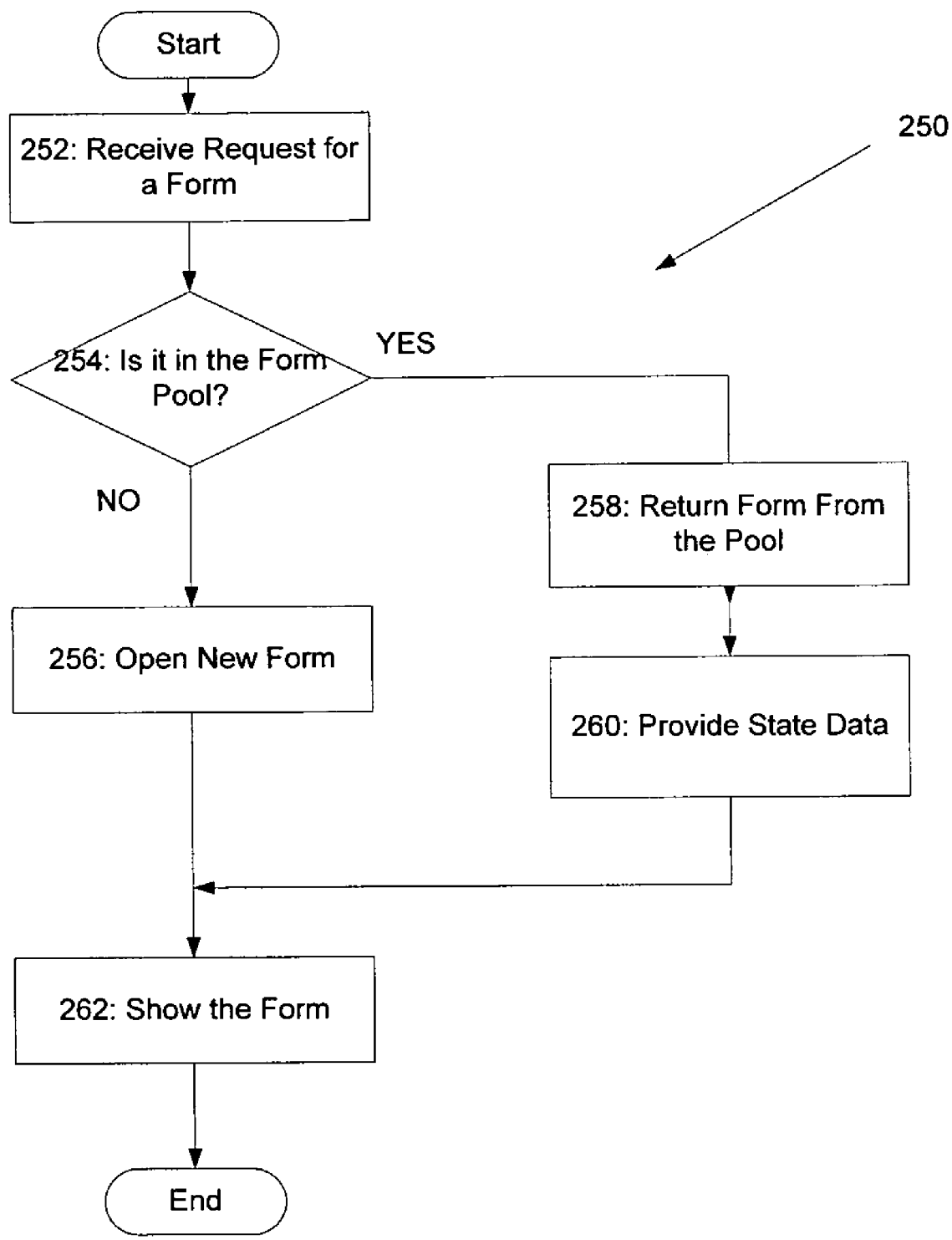
FIG. 4 illustrates a flowchart of a form closing program that may be used by the form pooling system of FIG. 3.

FIG. 4 discloses a flowchart for an open form program 250 that maybe used by the open form module 212 to manage requests from the client 202 for one or more forms. At a block 252 the open form module 212 receives a request to open a form. For example, a user of an accounting application may generate such a request by selecting to create a purchase transaction, or by selecting to view a financial statement report, etc.

In response to the request for a form, at a block 254, the open form module 212 determines if the requested form in stored in the form pool 206 or not. A requested form may be stored in the form pool 206 for a number of reasons. For example, the requested form may be recently used by the client 202 and the open form module 212 may have determined not to close it at the end of such recent use by the client 202. Alternatively, the requested form may be related to a currently open form and based on a pre-determined criteria, the form pool manager may have already opened and stored the requested form in the form pool 254.

In yet another case, based on another criteria, the requested form may be designated to be open at all the time as long as the client 202 is active. Such criteria may be determined by the open form module 212, or a user of the form pool manager 204 may be allowed to set one or more rules to determine such a criteria determining one or more forms to be stored in the form pool 206. For example, at a time of installing an application on the computer 110, a user of the application may indicate which forms should be saved in the form pool 206, how many forms should be saved on the form pool 206 at any given time, etc.

If it is determined at the block 254 that the requested form is not in the form pool 206, at a block 256, the open form module 212 opens a new instance of the requested form from the form storage 208. Note that in this situation, when the requested form in not in the form pool 206, the newly opened form from the form storage 208 may have various data and controls attached to the newly opened form, and such data and controls may be automatically updated during the opening of the form.

On the other hand, if at the block 254 it is determined that the requested form is available in the form pool 206, at a block 258, the open form module 212 may return the requested form to the client 202 from the form pool 206. Depending on the length of time the requested form has been in the form pool 206, the number of other activities related to various data attached to the requested form, and other updates related to the one by more applications related to the requested form, it may be necessary to update various data and control information attached to the requested form. For example, if the requested form is a trial balance statement of an accounting system and after that trial balance statement was saved in the form pool 206, there has been any activity related to any of the various accounts listed on that trial balance statement, it may be necessary to provide updated data to the trial balance statement form, before it can be displayed to the client 202.

Therefore, at a block 260, the open form module 212 may provide various state data to the requested form. Once the requested form receives various state data, it may update various fields to be displayed to the client and take one or more actions based on the rules attached to the requested form based on the updated state data. For example, if the requested form is a bank statement and there are one or more open transactions that may effect the balance on the bank statement, the bank statement form may generate and display a message to the client to confirm or post the open transaction or to give permission to show the bank statement without the effect of the open transactions.

Subsequently, at a block 262, the form pool manager 204 may display the requested form to the client 202.

Figure 5:
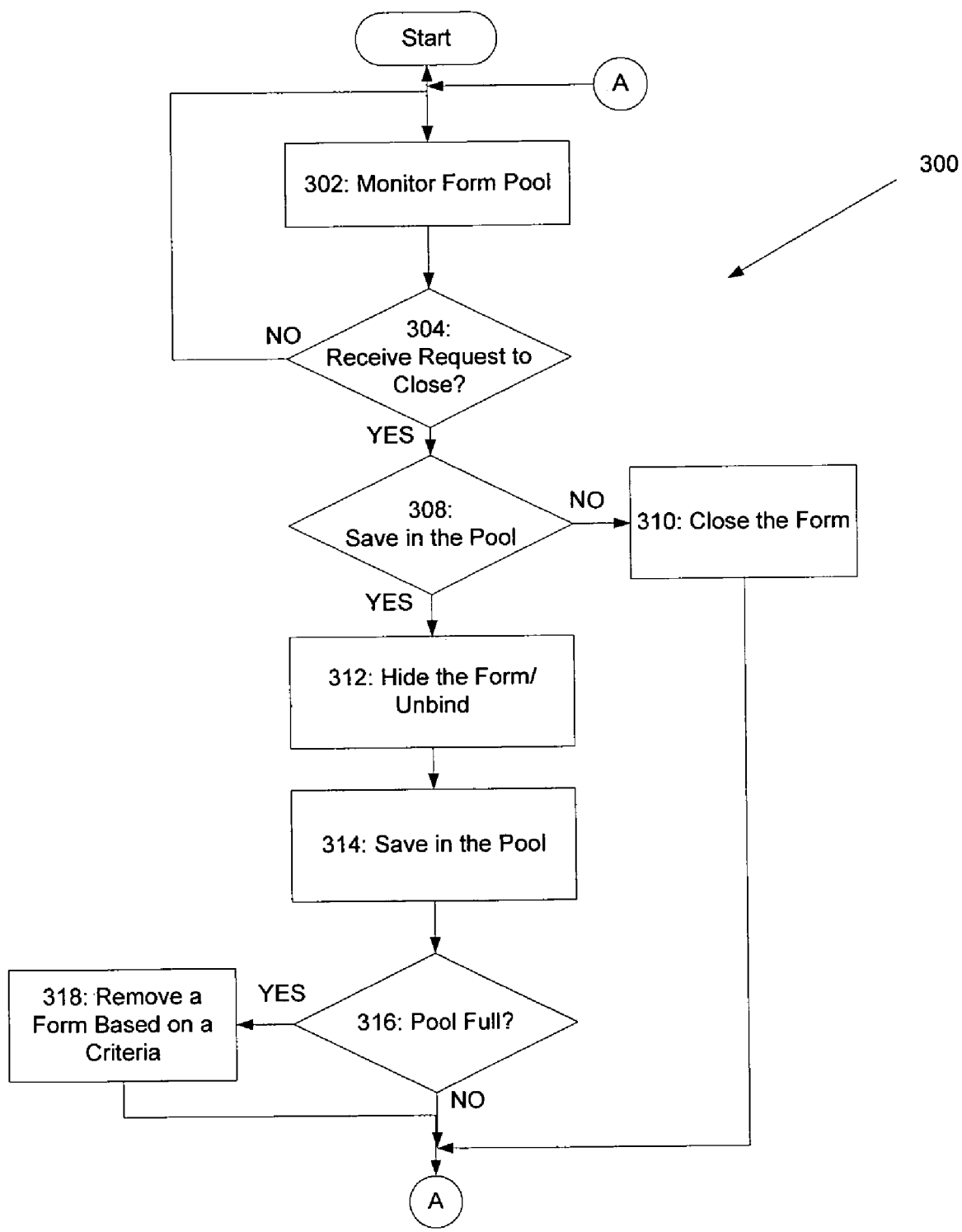
FIG. 5 illustrates a flowchart of a form opening program that may be used by the form pooling system of FIG. 3.

FIG. 5 discloses a flowchart for a close form program 300 that may be used by the close form module 214 to manage various requests to close one or more forms related to an application used by the client 202. The close form program 300 may either be invoked by the client 202 to close a form or alternatively the close form program 300 may also be used by the form pool manager 204 to determine if a form needs to be closed for being inactive for a specific period of time. As shown by the flowchart of the close form program 300, at a block 302, the close form module 214 continuously monitors various forms of one or more applications that may be used by the client 202.

A block 304 determines if the close form module 214 has received any request from a client, such as the client 202 or any other client application to close an open form. A client may provide such an instruction to close an open form by, for example, selecting a close form button on a graphical user interface displaying the open form, etc. If no such request to close an open form is received, the close form program 300 continues to monitor the form pool 206 and various forms related to the form pool 206.

If it is determined at the block 304 that a request to close an open form has been received or at the block 306 a form has been found that has been inactive for over a predetermined period of time, a block 308 determines if that particular form needs to be saved in the form pool 206. The close form module 214 may determine which form being closed is to be saved in the form pool 206 based on a number of different criteria. For example, one of such criteria may be how often that form is used in a predetermined time period. Another such criteria may use a ranking assigned to the form, where such a ranking may be assigned by a user at the time of installation of an application using that form, or based on some other predetermined criteria. Yet another criteria may be the amount of data related to the form and approximate time it may take to update such attached data. A combination of one or more of the above criteria may also be used.

If it is determined at the block 308 that a particular form does not need to be saved in the form pool 206, at a block 310, the close form module 214 may close the form. Such a closed form may be saved in the form storage 208 and the various data related to the form may be unbound from the form and saved in memory as necessary.

If it is determined at the block 310 that a particular form does need to be stored in the form pool 206, at a block 312, the close form module 214 hides that particular form from the view and unbinds various data attached to that particular form. In this case, even though the form that is being saved in the form pool 206 may have actually received a form close command from a user, the form pool manager 204 may cancel such a close command and simply hide the form and call a method to unbind the data from the form being saved in the form pool. When the form pool management system 200 is implemented, the forms used by such a system may be designed in a manner such that the forms are aware of pooling and the forms are designed to provide additional hooks to the form pool manager 204. For example, in an implementation, the forms may be designed to perform additional operations on themselves, such as unbinding, etc., every time the forms are placed in the form pool 206.

Subsequently, at a block 314 the close form module 214 may close that particular form in the form pool 206. Because the form pool 206 may be generally implemented in the random access memory, or in other similar media, saving the form in the form pool 206 may involve less unbinding of data and controls and more significantly, when that particular form is requested by the client 202, it needs less time to re-open that form from the form pool 206.

A block 316 may determine if the form pool 206 is full. Note that while in this implementation, the evaluation as to whether the form pool is full or not is undertaken after saving the form in the form pool, in an alternate implementation, such an evaluation may be made before the form is saved in the form pool 206. Alternatively yet, in another implementation, the form pool 206 may be of an indefinite size, where once it is determined that a form is to be saved on the form pool 206, it is always saved in the form pool 206 irrespective of the existing capacity of the form pool 206. In such a case, no evaluation of the capacity of the form pool 206 may be made at the block 316.

If the block 316 determines that there is no space available in the form pool 206, a block 318 may remove one or more forms, as necessary and based on a predetermined criteria, form the form pool 206. For example, one of the rules used to determine which forms need to be removed may be a first-in-first-out rule, where a form that has been in the form pool 206 for the longest time may be the first to be removed from the form pool 206 as necessary. Subsequently, the close form program 300 may resume monitoring the form pool 206 at the block 302.

An alternate implementation of the form pool 206 may be illustrated by a data structure that may contain various lists for each form types, wherein each of the lists contain forms of a specific type. Such a form pool may be restricted to an upper bound for the sum of all form instances in that form pool 206 and when the form pool 206 is full and another form is added to the pool an oldest form is removed from the pool to make room for the newly added pool.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A method of managing forms, the method comprising:
   receiving a request for closing a first form;
   determining if an instance of the first form is to be saved in a form pool implemented by a random access memory that contains a program immediately accessible to and presently being operated on by a processing unit; and
   if the first form instance is to be saved in the form pool then:
      hiding the first form without closing the first form instance, unbinding various data related to the first form instance, and placing the first form instance in the form pool; and
      if the first form instance is not to be saved in the form pool then closing the first form instance;
   upon receiving a request for opening the first form from the program in the random access memory, determining if an instance of the first form is in the form pool;
   if the first form instance is in the form pool, then retrieving the first form instance from the form pool, wherein retrieving the first form instance from the form pool further includes: (1) binding new application data related to the first form; and (2) setting various controls related to the first form; and
   if the first form instance is not in the form pool then opening a new instance of the first form from a form storage other than the random access memory.

2. A method of claim 1, wherein placing the first form instance in the form pool further comprises: (1) determining if the form pool is full; (2) selecting a form instance from the form pool based on a first criteria; and (3) removing the selected form instance from the form pool.

3. A method of claim 1, further comprising:
   reviewing a plurality of form instances in the form pool;
   determining if one of the plurality of form instances has been in the form pool for longer than a predetermined period of time; and
   removing the one of the plurality of form instances from the form pool.

4. A first computer storage medium having computer-executable instructions for performing operations comprising:
   a form opening module adapted to: (1) receive a request for a form; (2) retrieve a form instance of the form from a form pool implemented on a first computer storage medium, wherein the form pool comprises a plurality of lists, each of the plurality of lists containing form instances of a particular type of form, the first computer storage medium being a random-access memory that contains a program immediately accessible to and presently being operated on by a processing unit, bind various data to the form instance related to the form, and set various controls related to the form, if the form instance is in the form pool; and (3) to open a new instance of the form from a form storage implemented on a second computer storage medium different from the first computer storage medium if the form instance is not in the form pool; and
   a form closing module adapted to: (1) receive a request to close the form; (2) to determine if a form instance of the form needs to be saved in the form pool; (3) to save the form instance in the form pool and unbind various data related to the first form instance if it is determined that the form instance needs to be saved in the form pool; and (4) to close the form instance without saving it in the form pool if it is determined that the form instance does not need to be saved in the form pool.

5. The computer storage medium of claim 4, further comprising an inactive form detection module adapted to: (1) review a plurality of form instances in the form pool; (2) determine if one of the plurality of form instances has been in the form pool for longer than a pre-determined period of time; and (3) remove the one of the plurality of form instances from the form pool.

* * * * *